FIGURE 3 — ASBESTOS YARN / GLASS YARN

INVENTOR.

H. C. MORTON

United States Patent Office 3,600,258
Patented Aug. 17, 1971

3,600,258
FRICTION FACING COMPRISING A TAPE OF MATERIAL OF AT LEAST ONE STRAND OF GLASS YARN AND AT LEAST ONE STRAND OF ASBESTOS YARN IN SIDE-BY-SIDE RELATIONSHIP
Henry C. Morton, East Greenbush, N.Y., assignor to The Bendix Corporation
Filed Mar. 25, 1969, Ser. No. 810,277
Int. Cl. B32b 5/08, 5/26
U.S. Cl. 161—42
15 Claims

ABSTRACT OF THE DISCLOSURE

A friction facing for clutches and the like is disclosed which incorporates at least one yarn of filamentary glass fibers in the friction material prior to final fabrication to improve the burst strength of the friction facing. Additionally, bundles of filamentary treated glass fibers may be added to the facing at the I.D. and/or at the O.D. to further improve the hot burst strength of the friction facing.

SUMMARY OF THE INVENTION

The invention relates to friction facing for clutches and the like and primarily to friction facings comprised of a rubber or thermosetting-resin impregnated yarn formed into an annular matrix preform which is then pressed and heated to cure the rubber or resin to produce a finished article. Friction facings of this type are well-known and enjoy wide usage. These friction facings, when used in automotive clutches, are subjected to high rotational speeds and high centrifugal forces which have been known to cause the friction facings to burst. It is, therefore, an object of this invention to provide a means of increasing the burst strength (i.e., raising the limit of centrifugal forces which the friction facing can withstand without bursting) of friction facings.

Major automotive clutch manufacturers require that the driven member of the clutch, with two facings attached, be heated to 500° F. for 15 minutes and then be subjected to spin testing as a prerequisite to product acceptance. This hot burst test is usually the most difficult test to be passed by a friction facing since at elevated temperatures the binder materials, such as resin and rubber, lose tensile strength rapidly thereby resulting in bursts at relatively low rotational speeds. Prior art friction facings having an O.D. of ten (10) inches and an I.D. of six (6) inches are known to withstand this test up to spin speeds on the order of between 8,000 and 9,000 r.p.m. It is an object of this invention to provide a friction facing capable of withstanding the hot burst test up to rotational speeds on the order of 11,000 r.p.m. to 12,000 r.p.m. while maintaining the same physical dimensions.

There have been various attempts to reinforce the matrix of a clutch facing through the use of mechanically strong agents such as woven glass fabrics, open mesh wire fabrics, and metallic plates bonded to the back of the facing. These endeavors may all be characterized by high unit costs and by the difficulty encountered in keeping the composite structures flat and parallel during usage—a necessary attribute since clearances between engaged and disengaged clutch positions are very slight. Any deviation from the flat results in partial clutch engagement with resultant slippage and high wear as well as improper clutch action. It is, therefore, an object of this invention to provide a reinforcement for clutch facings which is fully compatible with the use requirements of the facing.

The use of metallic wires and screen fabrics, metallic backing plates and woven glass fabrics also produced operational difficulties in that these reinforcing material reacted to the heat generated in clutching very much differently than did the resin and asbestos yarn. This produced a non-flat facing surface and constant flexing weakened the clutch structure. It is, therefore, an object of this invention to provide reinforcing means for friction facings which means are operationally compatible with the friction facing. It is also an object of this invention to produce reinforcing means which are functionally and operationally compatible with the friction facing.

The various prior art reinforcing means produced difficulties which it is an object of this invention to eliminate singly and collectively. The use of a metallic backing plate is expensive and wasteful and results in a comparatively time-consuming manufacturing process since the metallic plate must be tailored to the proper configuration which is usually annular. The metal backing plate also increases the weight of the clutch and the stiffness and thermal properties of the metal result in excessive inertia, a tendency to buckle, and a loss of effectiveness of the clutch cushioning means.

The use of a woven mattes of fibrous glass as a backing member to which the yarn and resin or rubber are applied prior to final cure is less expensive than the metal backing plate, but is also less effective and produces the same degree of wastefulness. It is, therefore, an object of this invention to provide a friction facing having high burst strength which does not rely upon metallic or woven fibrous glass backing plate means.

It is inherent that any reinforcing material used in a friction facing must not alter the frictional characteristics of the facing or cause a change in the physical configuration of the member. Heretofore, such agents as metallic strands, metallic backing plates, and woven glass fabrics had deleterious effects upon either the frictional properties or the physical dimensions of the facings. For example, the use of steel or bronze wires and screen fabrics, or the like, have not proved satisfactory because all of these materials may cause scoring and abrasion of the mating surface when in contact with a cast iron flywheel or pressure plate. It is, therefore, an object of this invention to provide a reinforcement means for friction facings which does not alter the frictional characteristics thereof. It is a further object of this invention to provide a means of providing a reinforced backing for a friction facing which improves the burst strength thereof, is physically and frictionally compatible therewith, and does not require the use of special or expensive fabrication processes.

I have found that the use of a substantially continuous filamentary twisted and plied glass yarn, applied in a variety of different ways to a friction facing, improves the burst strength while presenting almost no wastage and without complicating fabrication. I have found, for instance, that a hoop of the above described glass yarn when included in either the I.D. or the O.D. or both, of a friction facing greatly improved the burst strength. I have also found that inclusion of the glass yarn with the asbestos yarn during the resin impregnating stage produces an end product having greatly improved burst strength.

BRIEF DESCRIPTION OF THE DRAWING

FIG. 3 shows the glass and asbestos strands used to form the yarn prior to application of the resin.

DETAILED DESCRIPTION

Figure 1:
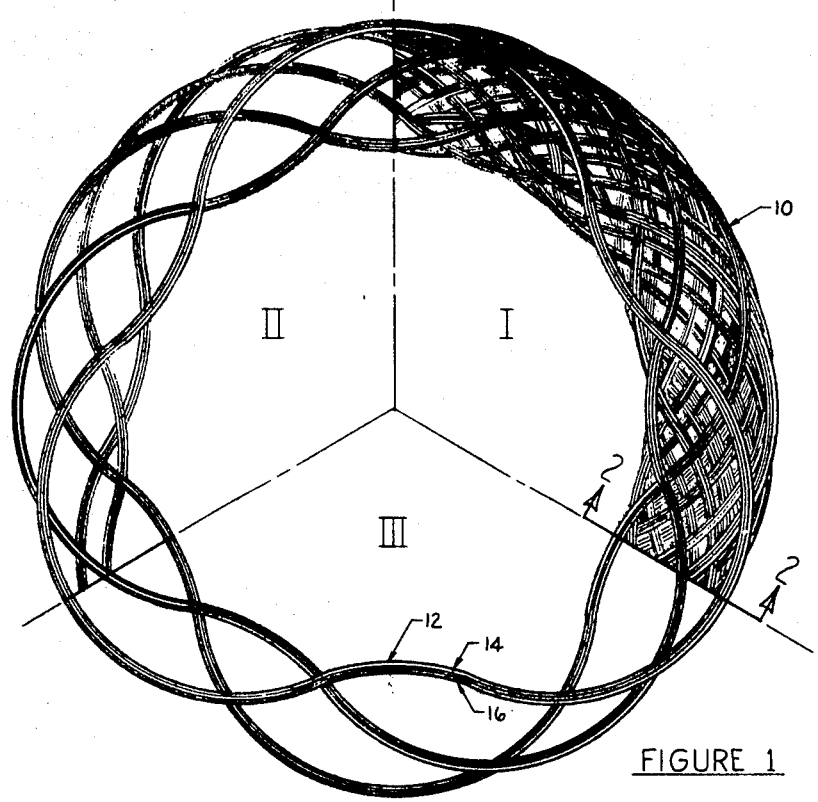
FIG. 1 shows a friction facing made with resin impregnated yarn at three stages of its formation.

Referring now to FIGS. 1 and 3, a clutch friction facing 10 is shown having three segments, I, II, III, illustrative of the completed clutch facing (I) and the intermediate (II) and early (III) stages of formation of the clutch matrix or preform. This configuration is well-known in the art and is formed by winding a tape 12 onto a rotating forming member, not shown. The tape 12 is comprised of one or more asbestos yarns 14 and one or more yarns 16 comprising substantially continuous filamentary twisted and plied glass yarn. The asbestos yarn 14 may or may not include metallic reinforcing wire strands of copper, brass, zinc or the like (i.e., metals which will not score the mating clutch surface).

In the practice of my invention, the facing and backing may be formed by substantially identical processes. Variation may, of course, occur in the ratio of glass yarn to asbestos yarn which, in the backing, may be higher than that encountered in the friction face.

The tape 12 is formed by passing the desired number of asbestos yarns and the desired number of glass yarns through a bath of the preferred friction compound or binder material in substantially side-by-side relationship to form a fully coated and impregnated tape which can then be dried or partially cured in the conventional manner for easy storage and handling. By binder material is meant any of the known binder materials, both of the rubber-base and thermosetting resin-base varieties, which may be used in conjunction with friction modifying materials to treat or impregnate asbestos yarn in the fabrication of organic friction facings for clutches and the like.

Figure 2:
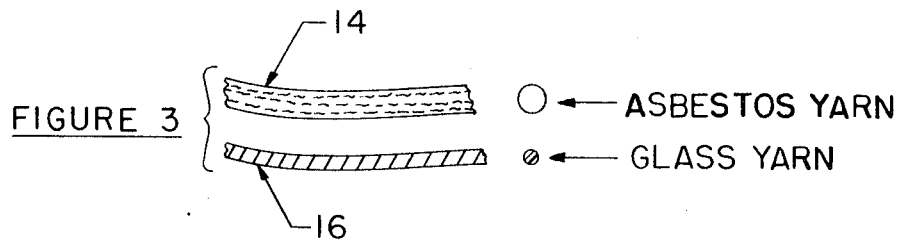
FIG. 2 shows a section taken along the line 2—2 of the facing of FIG. 1 and including the backing and the reinforcing hoops of glass yarn.
Figure 2:
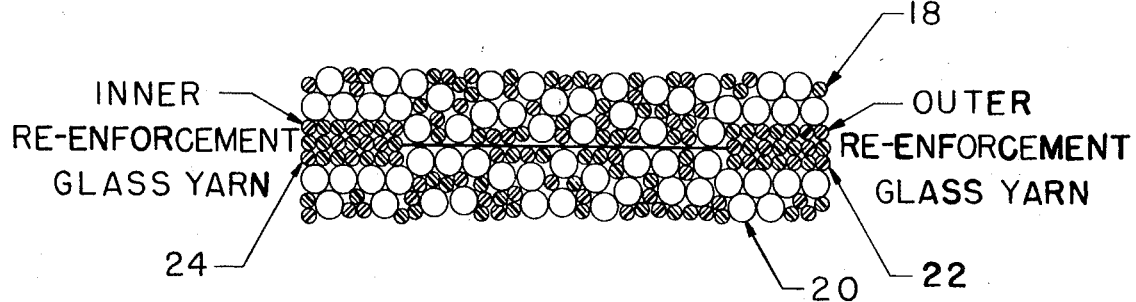

Referring now to FIG. 2, the sectional view of the completed clutch facing according to my invention is shown. The clutch facing comprises a contactive facing portion 18 and a backing portion 20 which are formed substantially identical with, but independent of, each other and are united immediately prior to the final steps of fabrication. Interposed between the facing 18 and the backing 20 are two hoops of wound glass yarn for additional reinforcement; one of these comprises the outer reinforcement 22 and is placed at the O.D. of the friction facing and the other, comprising the inner reinforcement 24, is placed at the I.D. of the friction facing. The final fabricating steps of pressing and curing then produces a finished article having the various glass yarns substantially permanently fixed in position by the cured resin.

The reinforcing hoops 22 and 24 are fabricated by treating the individual glass yarns with high strength phenolic resin solutions which may be derived from phenols, cresols, epoxies and the like prior to the formation of the hoops. After application of the resin solution, the solvent is removed by passage through a drying oven. This leaves the residual resin on the glass yarn in a partially reacted or B stage. Thus, when the hoops are formed and inserted into the clutch facing matrix, the further application of heat and pressure converts the resin to a thermoset form yielding a strong rigid hoop which is strongly bonded to the friction face layer and to the backing layer of the clutch facing.

The outer and inner reinforcement hoops 22 and 24 are shown as having a certain number of strands of the glass yarn which, for the sake of uniformity, has been shown as the same in both hoops. This relationship need not, of course, be maintained in the practice of my invention as I have found that the presence of either hoop improves the burst strength of these friction facings. Because the fabrication of the facing and backing means is substantially identical, the behavior of the clutch facing to various operating conditions is substantially uniform, the behavior of the clutch facing to various operating conditions is substantially uniform. The presence of the glass yarn 16 within the tape 12 provides a substantially continuous reinforcing means which improves the burst strength of the friction facing portion or layer 18. Because the yarn 16 is imbedded in the tape 12 prior to the winding of the tape into the desired configuration the yarn 16 is substantially uniformly distributed radially and axially throughout the facing layer 18 and the backing layer 20 both in the radial and in the axial directions. This, therefore, provides a means of strengthening the facing layer 18 per se, as well as providing a strengthened backing layer 20 and because of the uniform distribution of the yarn 16, there is no tendency for the facing portion 18 to warp or lose its flatness. Since the asbestos yarn 14 has a substantially greater diameter than does the glass yarn 16, the presence of the glass yarn 16 is effectively masked and will not adversely affect the frictional characteristics of the clutch facing.

For improved burst strength, a relatively low ratio of glass yarn to asbestos yarn may be used in the facing portion of the clutch facing while the ratio of glass yarn to asbestos yarn in the backing portion of the clutch facing may be quite high. In this manner, the frictional properties of the clutch, according to my invention, will remain virtually unaffected by the presence of the glass yarn while the burst strength will be greatly improved. For instance, I have found that a friction facing portion fabricated with a ratio of strands of glass yarn to strands of asbestos yarn of 1:2 and with four strands of asbestos yarn included in the tape, the burst strength of the facing portion is improved while the frictional characteristics of the facing portion are virtually unaffected by the presence of the glass yarn. On the other hand, the backing portion of the friction facing, which is, of course, not subjected to wear except at the very end of the life of the friction facing may have a higher ratio of strands of glass yarn to strands of asbestos yarn on the order of 1:1 or higher. Since the backing portion need not be expected to function as effectively as the facing portion, the reduced frictional characteristics due to the higher density of glass yarn are not considered to be adverse when the improved strength of the friction facing is taken into consideration.

By way of an example, a typical prior art clutch facing, similar in appearance to that shown in FIG. 1, Section I, having an O.D. of ten (10) inches and an I.D. of six (6) inches and a thickness of .135 inch, will on the average withstand spins at elevated temperatures of 500° F. to about 8000 r.p.m. and will burst at speeds between 8000 r.p.m. and 9000 r.p.m. I have found that clutches employing facings according to my invention having the same dimensions and subjected to spin at the elevated temperature of 500° F will, on the average, withstand speeds of up to 11,000 r.p.m. and will burst between 11,000 r.p.m. and 12,000 r.p.m. This represents a significant elevation of the burst speed of clutches using friction facings according to my invention.

I claim:
1. A disk shaped friction facing having an inner diameter and an outer diameter, said facing comprising:
   a tape of material disposed in an undulating annular fashion and compressed to form said disk shaped friction facing, said tape of material comprising:
   a plurality of strands disposed substantially in side-by-side relationship, said plurality of strands including at least one strand of asbestos yarn and at least one strand of glass yarn; and
   a binder material for binding said strands together to form said tape.
2. The friction facing as recited in claim 1 wherein said tape of material is a continuous tape.
3. The friction facing as recited in claim 1 wherein said strands of asbestos and glass are continuous strands.
4. The friction facing as recited in claim 1 wherein said strand of glass yarn is a substantially continuous filamentary twisted and plied glass yarn.
5. The friction facing as recited in claim 1 including at least one hoop of glass yarn disposed in said disk shaped friction facing, said hoop comprised of a plurality of windings of glass yarn bound together by a binder material to form said hoop.

6. The friction facing as recited in claim 5 wherein a hoop of glass yarn is disposed at the inner diameter of said friction facing disk.

7. The friction facing as recited in claim 5 wherein a hoop of glass yarn is disposed at the outer diameter of said friction facing disk.

8. The friction facing as recited in claim 5 wherein there is one hoop of glass yarn at the inner diameter of said friction facing disk and another hoop of glass at the outer diameter of said friction facing disk.

9. The friction facing as recited in claim 5 wherein said tape of material is a substantially continuous tape disposed in layers in an undulating annular fashion.

10. A flat tape of friction material wound and compressed to form a disk shaped friction facing having the flat sides of the tape disposed generally parallel to the plane of the face of the disk, said tape of friction material comprising:
   at least one strand of asbestos yarn;
   at least one strand of glass yarn in substantially side-by-side relationship to said asbestos yarn; and
   a binder material for binding said asbestos yarn to said glass yarn to form said flat tape of friction material.

11. The friction facing as recited in claim 10 wherein said glass yarn is a substantially continuous filamentary twisted and plied glass yarn.

12. The friction facing as recited in claim 11 including at least one hoop of glass yarn disposed in said disk shaped friction facing, said hoop comprised of a plurality of windings of glass yarn bound together by a binder material to form said hoop.

13. The friction facing as recited in claim 10 wherein said strand of asbestos yarn is a substantially continuous strand and said glass yarn is a substantially continuous strand.

14. The friction facing as recited in claim 10 wherein said tape of material is a continuous tape.

15. The friction facing as recited in claim 10 including at least one hoop of glass yarn disposed in said disk shaped friction facing, said hoop comprised of a plurality of windings of glass yarn bound together by a binder material to form said hoop.

References Cited
UNITED STATES PATENTS

| | | | |
|---|---|---|---|
| 2,025,039 | 12/1935 | Cannon | 161—42 |
| 2,079,173 | 5/1937 | Judd | 161—42 |
| 2,196,570 | 4/1940 | Walters | 161—42X |
| 2,217,915 | 10/1940 | Mehnert | 161—42 |
| 2,901,388 | 8/1959 | Morton | 161—35X |
| 2,943,010 | 6/1960 | Stefl et al. | 161—101X |
| 3,365,041 | 1/1968 | Stormfeltz | 161—205X |
| 3,429,766 | 2/1969 | Stormfeltz | 161—42X |

JOHN T. GOOLKASIAN, Primary Examiner

J. C. GIL, Assistant Examiner

U.S. Cl. X.R.

161—35, 47, 72, 93, 140; 192—107M